United States Patent [19]
Fujioka et al.

[11] Patent Number: 4,588,937
[45] Date of Patent: May 13, 1986

[54] POSITION CONTROL APPARATUS

[75] Inventors: Yoshiki Fujioka, Yamato; Naoto Ota, Hino; Mitsuhiko Hirota, Tokyo, all of Japan

[73] Assignee: Fanuc Ltd., Minamitsuru, Japan

[21] Appl. No.: 683,017

[22] PCT Filed: Apr. 13, 1984

[86] PCT No.: PCT/JP84/00187
§ 371 Date: Dec. 13, 1984
§ 102(e) Date: Dec. 13, 1984

[87] PCT Pub. No.: WO84/04182
PCT Pub. Date: Oct. 25, 1984

[30] Foreign Application Priority Data
Apr. 13, 1983 [JP] Japan .................... 58-064916

[51] Int. Cl.$^4$ .................................. G05F 1/00
[52] U.S. Cl. ......................... 318/677; 318/561; 318/594; 318/611; 318/678
[58] Field of Search .............. 318/677, 678, 611, 561, 318/594

[56] References Cited

U.S. PATENT DOCUMENTS

| | | | |
|---|---|---|---|
| 4,342,950 | 8/1982 | Kohzai et al. | 318/611 |
| 4,347,470 | 8/1982 | Kohzai et al. | 318/594 X |
| 4,355,273 | 10/1982 | Du Vall | 318/594 X |
| 4,379,987 | 4/1983 | Kohzai et al. | 318/561 |

Primary Examiner—B. Dobeck
Attorney, Agent, or Firm—Staas & Halsey

[57] ABSTRACT

A position control apparatus has a variable gain-type velocity amplifier (115) provided within a servo control circuit, and a low velocity sensing circuit (114) for sensing a predetermined low velocity of a motor (100) immediately before the motor is stopped. When the rotational velocity of the motor (100) drops to the predetermined low velocity immediately before stoppage during orientation control, the velocity amplifier is changed over in response to a signal from the gain of the low velocity sensing circuit (114), thereby raising servo loop gain.

6 Claims, 3 Drawing Figures

POSITION CONTROL APPARATUS

BACKGROUND OF THE INVENTION

This invention relates to a position control apparatus for stopping or positioning the spindle of a machine tool or the like at a predetermined rotational angle. More particularly, the invention relates to a position control apparatus capable of enhancing servo rigidity when a spindle is stopped.

To stop a spindle at a predetermined rotational angle in an NC machine tool, by way of example, an error quantity, which is the difference between a commanded position and the present position of the spindle, is subjected to a digital-to-analog conversion by a DA converter to obtain a velocity control command signal, and the velocity of a motor for rotating the spindle is controlled by the control command signal.

In performing such position control, the gain of a velocity loop is made higher at the time of orientation (when the spindle is brought to a stop at a reference position) than at the time of ordinary rotation, thereby enhancing servo stability at the stopping time to increase the holding force.

In the prior art, gain changeover timing is taken at the instant at which a certain angular range is reached, such as a half revolution short of a target stopping position for orientation, and control is exercised in such a manner that the gain of a velocity amplifier is raised when the point one-half revolution short of the target stopping position is reached. In this way about twice the servo rigidity can be obtained in comparison with a case where orientation is performed at the gain which prevails during ordinary rotation.

However, the gain of the velocity amplifier is affected by the size of the applied velocity command signal. When the gain is raised while the velocity is high, as at the point one-half revolution short, the operating characteristic of the velocity amplifier becomes unstable. Consequently, the gain cannot be raised very much. In other words, a required, satisfactory servo rigidity cannot be obtained.

SUMMARY OF THE INVENTION

It is an object of the present invention seeks to solve the aforementioned problem encountered in the prior art.

In particular, it is an object of the present invention to provide a position control apparatus capable of sufficiently raising the gain of a servo control system for controlling an NC machine tool spindle or the like, thereby allowing high servo rigidity to be obtained.

In order to attain the objects of the invention set forth above, the present invention provides a position control apparatus comprising a servo control circuit for rotating a motor by following an offset between a commanded velocity and an actual velocity, and an orientation control circuit for stopping the motor at a predetermined position upon receiving an orientation signal as the commanded velocity. The position control apparatus is characterized in that the servo control circuit is internally provided with a velocity amplifier having changeover means capable of making servo loop gain higher than that which prevails during servo control (which is when the motor is controlled by following the offset between the commanded velocity and the actual velocity), and in that there is provided a low velocity sensing circuit for sensing a predetermined low velocity just before the motor is stopped, wherein when the rotational velocity of the motor drops to the predetermined low velocity just before stoppage during orientation control, servo loop gain is raised by changing over the velocity amplifier in response to a signal from the low velocity sensing circuit. Further, according to the present invention, a position control apparatus is also provided in which the foregoing arrangement is additionally equipped with a switch control circuit, motor velocity sensing means, low-velocity sensing means, and a gate circuit.

In this way a high gain can be set in a range where the velocity amplifier input signal is small, so that the object of obtaining a sufficiently high servo rigidity can be attained. If this object is realized, the operating characteristic of the velocity amplifier will not become unstable even in a state where the rotational velocity of the spindle is high, thereby enabling a stable and sufficiently large motor holding force to be obtained at stopping time. Spindle position control can be executed rapidly and at high precision.

DESCRIPTION OF THE PREFERRED EMBODIMENT

To set forth the invention in greater detail, the invention will now be described in conjunction with the accompanying drawings.

Figure 1:
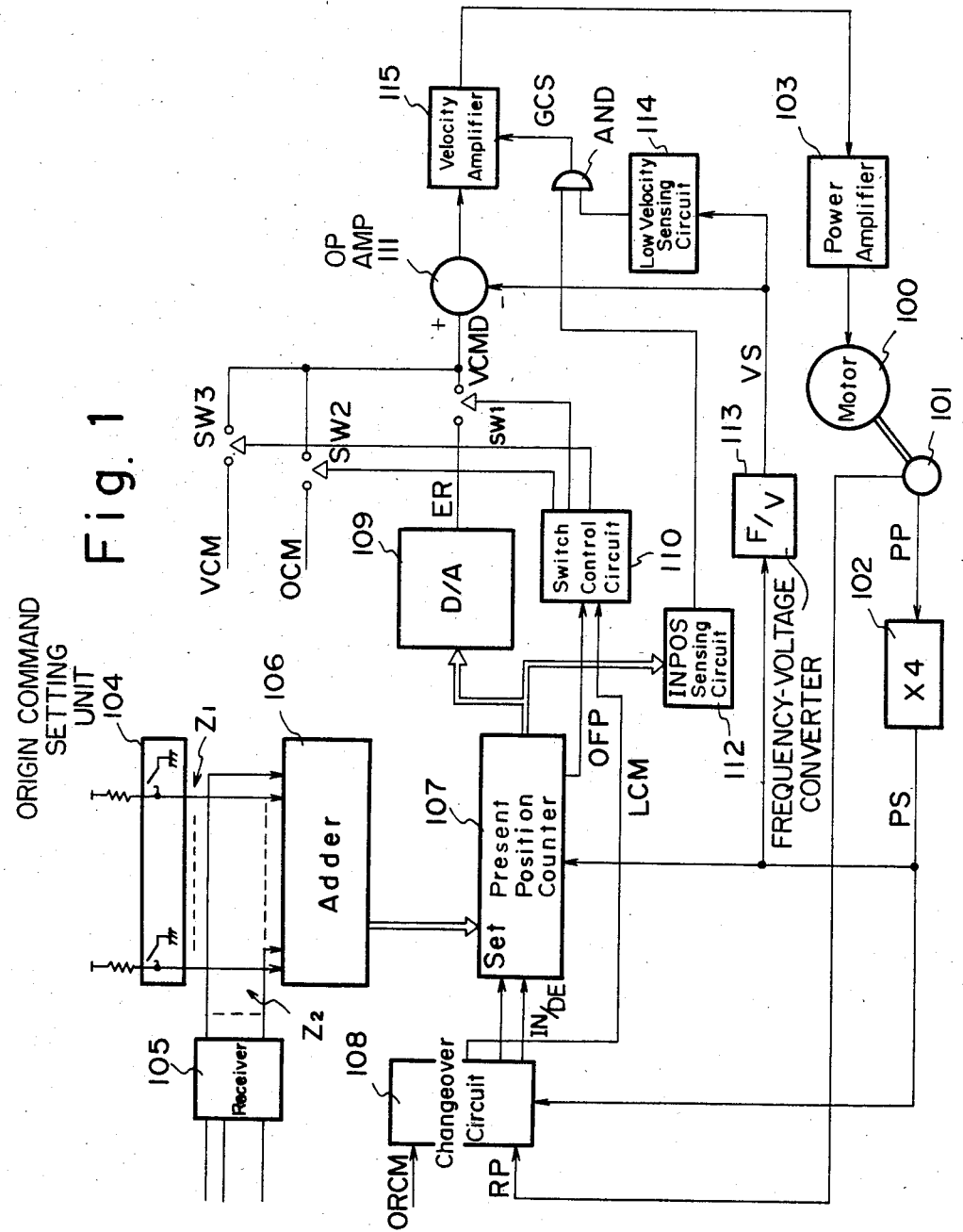
FIG. 1 is a block diagram of an embodiment of the present invention.

FIG. 1 is a block diagram of an embodiment of the present invention. Numeral 100 denotes a motor which may be for either AC or DC. Numeral 101 denotes a rotation sensor connected to the spindle of the motor 100 for producing a position pulse PP each time the spindle rotates through a predetermined rotational angle, and a one-revolution pulse RP each time the spindle makes one revolution. Designated at 102 is a quadrupling circuit for generating pulses PS having a frequency four times that of the position pulses PP. Numeral 103 represents a power amplifier constituting a portion of a current control loop for driving the motor 100. An origin command setting unit 104 sets, as a binary origin command, a rotational quantity $Z_1$ between an absolute origin AO and a machine origin MO. A receiver 105 receives a rotational quantity (commanded quantity) $Z_2$ for travel from the machine origin MO, which quantity is provided by an NC or the like. Numeral 106 designates an adder for adding the rotational quantity $Z_1$ from the origin command setting unit 104 and the commanded rotation quantity $Z_2$ from the receiver 105. A present position counter 107 is constituted by a reversible counter of counting capacity n (4096) for adding or subtracting the pulses PS in accordance with a command. Numeral 108 represents a changeover circuit for issuing a low-velocity command in response to an orientation command ORCM, and for setting the present position counter 107 to the status of the adder 106 in response to the one-revolution pulse RP, so that the counter may subtract the pulses PS. A DA converter 109 produces an output of zero for an input of n/2, and a maximum output for an input of n or zero.

Numeral 110 designates a switch control circuit for controlling the on/off action of switches SW1, SW2, SW3 in accordance with an input signal. Shown at 111 is an operational amplifier for obtaining the difference between a velocity command VCMD and the actual velocity VS of the motor 100, and for delivering the difference as a torque command. An in-position sensing circuit 112 is for generating an in-position signal upon sensing the fact that the status of the present position counter 107 has attained a value (e.g., zero) one-half revolution short of a target stopping position. Numeral 113 denotes a frequency-voltage converter (F-V converter) for generating, as the actual velocity VS, a voltage proportional to the frequency of the quadrupled pulses PS. A low velocity sensing circuit 114 senses the fact that the actual velocity VS is within a range close to a velocity of zero (i.e., that the actual velocity VS of the spindle motor 100 is within a sufficiently low range, e.g., ±0.75% of rated velocity). A velocity amplifier 115 is capable of having its gain varied externally.

Figure 2:
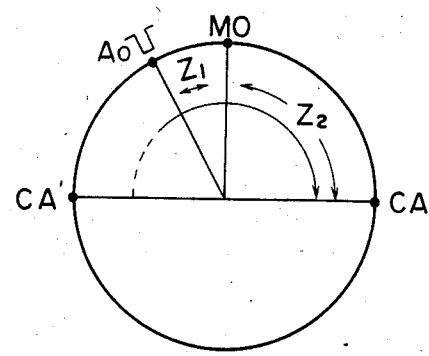
FIG. 2 is a diagram for describing the operation of the arrangement shown in FIG. 1.

The operation of the arrangement embodied in FIG. 1 will now be described with reference to the diagram of FIG. 2. [1] First, if the motor 100 is rotating at high speed, the switch control circuit 110 closes the switch SW3, whereby a velocity command VCM is applied to the operational amplifier 111 via the switch SW3 as the velocity command VCMD. The operational amplifier 111 produces, as a torque command, the difference between the actual velocity VS (the output of the F-V converter 113) of the motor 100 and the velocity command VCM. The torque command is provided with a predetermined gain in the velocity amplifier 115 and is then delivered to the power amplifier 103. Since the velocity amplifier 115 is set to a low gain, the amplifying operation thereof will be performed stably even if the torque command is large in magnitude. The power amplifier 103 performs prescribed current loop control to control the motor 100 so that the motor will rotate at the velocity of the velocity command VCM. [2] When the orientation command arrives at the changeover circuit 108, the latter issues a low-velocity command LCM and applies the same to the switch control circuit 110. The latter therefore opens the switch SW3 and closes the switch SW2. As a result, an orientation velocity command OCM is delivered, via the switch SW2, to the operational amplifier 111, velocity amplifier 115 and power amplifier 103, whereby the motor 100 is rotated at an orientation velocity in the manner described above. More specifically, when the motor 100 is rotating a high speed, the motor is decelerated down to the orientation velocity so as to reduce the abovementioned velocity offset. When at rest, the motor is accelerated up to the orientation velocity. [3] When the motor 100 is rotated in this manner and the absolute origin AO (FIG. 2) is reached, the sensor 101 produces the one-revolution pulse RP. With reference now to FIG. 2, the aforementioned absolute origin AO ordinarily differs from the predetermined machine origin MO due to a sensor mounting error. Therefore, first the rotational quantity $Z_1$ between the absolute origin AO and the machine origin MO is obtained, then the rotational quantity $Z_2$ up to a target position CA is calculated, with the machine origin MO serving as the starting point. The changeover circuit 108 sets the status $(Z_1+Z_2)$ of the adder 106 in the present position counter 107. The inputs to the adder 106 are the rotational quantity Z1 obtained from the origin command setting unit 104, and the commanded quantity $Z_2$ obtained from the receiver 105 and indicative of rotation from the machine origin MO to the target position. The status of the adder 106 is thus $(Z_1+Z_2)$ (FIG. 2). The changeover circuit 108 applies a decrement command DE (or an increment command IN when the motor is rotating in the reverse direction) to the present position counter 107, whereby the counter subtracts the pulses PS obtained from the quadrupling circuit 102. In accordance with the subtraction operation, the status of the present position counter 107 reaches a value of zero and then is further decremented from zero to $(n-1)$. When this occurs, the counter issues an overflow signal OFP, which is applied to the switch control circuit 110. The latter opens the switch SW2 and closes the switch SW1. At this instant the spindle is at the target position CA. At the same time, the in-position sensing circuit 112 issues the in-position signal in response to the status of zero attained by the present position counter 107. [4] In response to closure of the switch SW1, the status of the present position counter 107 is applied to the DA converter 109 so that an analog error ER is applied to the operational amplifier 111. The setting is such that the output of the DA converter 109 is zero for an input of n/2 and a maximum voltage for an input of n or zero. Since the maximum voltage is set to a voltage equal to that of the orientation velocity command OCM, there is no change in applied voltage even if switch SW2 is opened and switch SW1 closed. Accordingly, the changeover to the position loop takes place in smooth fashion. As a result, the operational amplifier 111 is supplied with the voltage from the DA converter 109, which voltage is in accordance with the status of the present position counter 107. The difference between this voltage and the actual velocity VS is calculated and applied to the power amplifier 103 via the velocity amplifier 115, so that the velocity of the motor 100 is controlled in accordance with the status of the present position counter 107. [5] Since the pulses PS generated by rotation of the motor 100 are subtracted within the present position counter 107, the output of the DA converter 109 successively diminishes so that the motor 100 is decelerated. When the status of the counter 107 eventually reaches n/2, the output of the DA converter 109 becomes zero and the motor 100 stops. In other words, the motor comes to rest at a position CA' one-half revolution distant from the target position CA, as shown in FIG. 2.

Thus, as a result of the orientation command ORCM, the motor can be stopped, positioned at high speed and with good precision, at an absolute address position distant from the absolute origin AO or machine origin MO.

Figure 3:
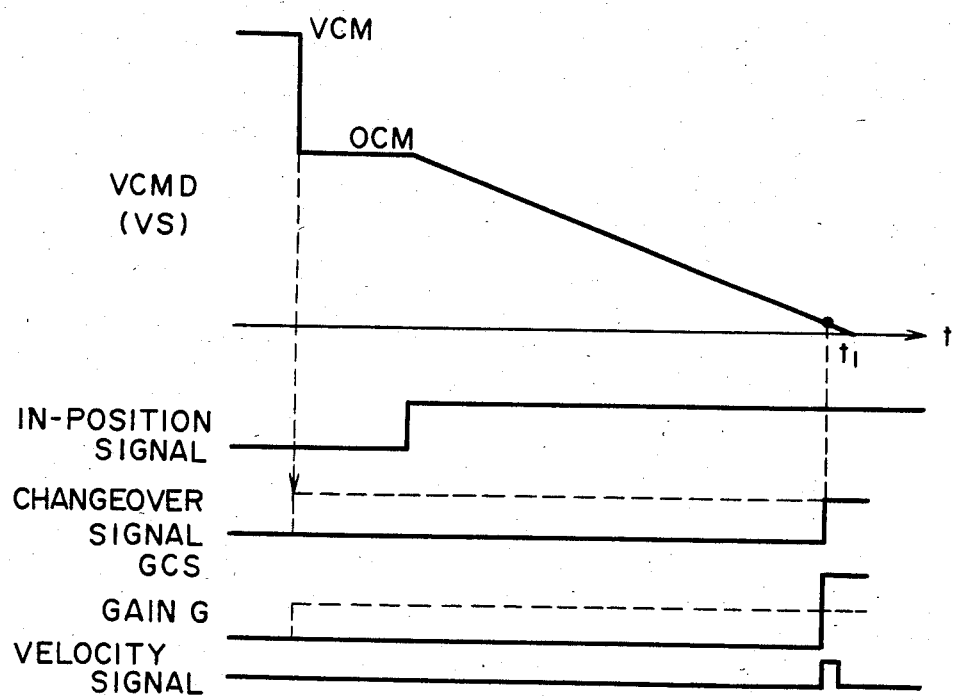
FIG. 3 is a graph illustrating a time chart associated with the arrangement of FIG. 1.

During the course of the decrementing process performed by the present position counter 107, the low velocity sensing circuit 114 monitors the actual velocity V of the motor 100. This will be described with reference to FIG. 3. The velocity command VCMD (actual velocity VS) gradually diminishes the orientation command OM and the actual velocity VS attains a value near zero velocity (time $t_1$). When this occurs, the low velocity sensing circuit 114 issues a gain changeover command GCS. Since an AND gate AND has already been opened by the in-position signal, the changeover signal GCS is applied to the velocity amplifier 115 to set the gain thereof high. Since the gain of the velocity amplifier 115 is capable of being varied by a resistor, it will suffice if the gain setting resistor is set by the changeover signal GCS to a value giving a high gain.

The reason for taking the logical product of the in-position signal and the output of the low-velocity sensing circuit by means of the AND gate AND is to prevent the gain from being changed at times other than when orientation is being carried out.

Thus, the circuit of the present embodiment is adapted to changeover the gain upon sensing that the actual velocity of the motor is sufficiently low. The velocity amplifier can therefore be set to a high gain when the input signal (torque command) is small in magnitude. As a result of the small input signal, therefore, instability will not result even when the gain is made sufficiently high (e.g. threefold). By contrast, with conventional gain changeover indicated by the dashed line in FIG. 3, the change is made one-half revolution short, so that the input signal applied to the velocity amplifier is large in magnitude. Accordingly, operation becomes unstable when high gain is set, so that the limit is a doubled gain. The result is that satisfactory servo rigidity cannot be obtained.

Though it is described above that the gain of the velocity amplifier 115 is designed for two stages, namely high and low, a plurality of stages can be provided and individually selected in dependence upon the velocity of the motor.

With the circuit of the present embodiment, therefore, servo rigidity can be improved by obtaining a higher gain at stopping time, whereby a spindle can be subjected to a large holding force to resist displacement from the stopping position caused by externally applied forces.

Further, according to the present embodiment, the arrangement is such that the gain of the velocity amplifier is changed when a set low-velocity region is attained (i.e., when a set low velocity has been sensed) in the orientation mode as the rpm of the motor 100 is being sensed. If the gain changeover circuit is manufactured as a product, separate from an NC control block, in the form of a block including the frequency-voltage converter 113 for sensing the actual velocity VS of the motor, the low velocity sensing circuit 114, the AND gate AND for controlling the velocity amplifier 115 by taking the logical product of the in-position signal and low-velocity signal, and the switch control circuit 110, then the gain changeover circuit can be utilized for general purposes as a gain controller for control amplifiers other than a velocity amplifier.

If the switch control circuit 110, frequency-voltage converter 113, low velocity sensing circuit 114 and gate AND are constructed as single-block circuitry, such as a custom LSI, then the present invention can be practiced merely by furnishing a conventional servo control system with the circuitry.

In a position control apparatus for positionally controlling a motor by the output of a velocity amplifier, the present invention changes the gain of the velocity amplifier when the actual velocity of the motor reaches a set low velocity. Therefore, in addition to stably providing a sufficient gain with the input signal to the velocity amplifier residing in a region of low magnitude, the force which holds a spindle at rest following generation of an in-position signal can be strengthened. The invention is therefore effective for applications in which sufficient servo rigidity is required, as in numerical control units for transporting a movable machine element to a stopping position or other predetermined position. This makes possible an improvement in control function.

What is claimed is:

1. A position control apparatus for a motor, comprising:
   a servo control circuit for rotating the motor during normal servo control by following an offset between a commanded velocity and an actual velocity of the motor; and
   an orientation control circuit for stopping the motor at a predetermined position upon receiving an orientation signal as the commanded velocity, said servo control circuit including:
   a velocity amplifier having changeover means capable of making servo loop gain higher than that which prevails during the normal servo control; and
   a low velocity sensing circuit, coupled to said velocity amplifier and the motor, for sensing a predetermined low velocity as the motor is being stopped, the servo loop gain being raised by the changeover means of said velocity amplifier in response to a signal from said low velocity sensing circuit when the rotational velocity of the motor drops to the predetermined low velocity during orientation control.

2. A position control apparatus for a motor, comprising:
   a servo control circuit for rotating the motor during normal servo control by following an offset between a commanded velocity and an actual velocity of the motor; and
   an orientation control circuit for stopping the motor at a predetermined position upon receiving an orientation signal as the commanded velocity, said servo control circuit including:
   a velocity amplifier having changeover means capable of making servo loop gain higher than that which prevails during the normal servo control;
   a switch control circuit for switching between a servo control operation and an orientation control operation;
   motor velocity sensing means;
   a low velocity sensing circuit, coupled to said velocity amplifier and said motor velocity sensing means, for sensing a predetermined low velocity of the motor as the motor is stopping; and
   a gate circuit provided between said velocity amplifier and said low velocity sensing circuit, said gate circuit being opened only when the motor reaches a predetermined position during orientation control, the servo loop gain being raised by the changeover means of said velocity amplifier in response to a signal from said low velocity sensing circuit when the rotational velocity of the motor drops to the predetermined low velocity during the orientation control operation.

3. A position control apparatus according to claim 2, wherein said switch control circuit, said motor velocity sensing means, said low velocity sensing means and said gate circuit are constructed in the form of a single block.

4. A position control apparatus for enhancing servo stability of a motor in a servo control system having a normal servo control mode and an orientation control mode, comprising:
   first means, coupled to the motor, for providing an actual velocity signal and for providing an in position signal when the motor has reached a target position during the orientation control mode;

second means, operatively connected to said first means, for providing a first switching signal when said servo control system is in the normal servo control mode, for providing a second switching signal when the servo control system is in the orientation control mode, and for providing a third switching signal when said second means receives the in position signal while the servo control system is in the orientation control mode;

third means, operatively connected to said second means, for providing a command signal comprising one of a velocity command signal, an orientation command signal and an analog error signal in dependence upon the first, second and third switching signals, respectively;

fourth means, operatively connected to said third means and said first means, for generating a torque command signal based on the command signal and the actual velocity signal;

low velocity sensing means, operatively connected to said first means, for providing a gain changeover command signal when the actual velocity of the motor drops below a predetermined velocity and said first means is generating the in position signal; and a velocity amplifier, operatively connected to said fourth means, said low velocity sensing means and the motor, for providing an amplified torque command to the motor, said velocity amplifier having a first gain when the gain changeover command signal is not being generated by said low velocity sensing means, and having a second gain which is greater than the first gain, when the gain changeover command signal is generated.

5. A position control circuit as set forth in claim 4, wherein said low velocity sensing means comprises:

a low velocity sensing circuit for generating a low velocity signal when the actual velocity of the motor drops below the predetermined velocity; and a gate circuit, operatively connected to said low velocity sensing circuit and to said velocity amplifier, for generating the gain changeover command signal upon receiving both the in position signal and the low velocity signal.

6. A position control circuit as set forth in claim 5, wherein the second gain is at least three times the first gain.

* * * * *

UNITED STATES PATENT AND TRADEMARK OFFICE
CERTIFICATE OF CORRECTION

PATENT NO. : 4,588,937
DATED : May 13, 1986
INVENTOR(S) : YOSHIKI FUJIOKA ET AL.

It is certified that error appears in the above-identified patent and that said Letters Patent is hereby corrected as shown below:

FRONT PAGE, [57] ABSTRACT, line 8, after "the" insert --gain of the--.

line 9, delete "gain of the".

Col. 1, line 26, delete ", such".
line 27, "as a" should be --e.g., one--.
line 45, delete "seeks".

Col. 3, line 67, "Z1" should be --$Z_1$--.

Col. 4, line 59, "OM" should be --OCM--.

Col. 5, line 49, "and" should be --and AND--;
line 50, delete "AND".

Signed and Sealed this

Nineteenth Day of August 1986

[SEAL]

Attest:

DONALD J. QUIGG

Attesting Officer

Commissioner of Patents and Trademarks